UNITED STATES PATENT OFFICE.

HERMANN STERN, OF MUNICH, GERMANY.

MANUFACTURE OF DIOLEFINS, (ISOPRENE,) CAOUTCHOUC, AND CAOUTCHOUC-LIKE SUBSTANCES.

1,218,332.    Specification of Letters Patent.    Patented Mar. 6, 1917.

No Drawing.    Application filed July 17, 1914. Serial No. 851,486.

*To all whom it may concern:*

Be it known that I, HERMANN STERN, citizen of Bavaria, residing at Munich, Bavaria, Germany, have invented certain new and useful Improvements in the Manufacture of Diolefins, (Isoprene,) Caoutchouc, and Caoutchouc-like Substances; and I do hereby declare the following to be a full, clear, and exact description of the invention, such as will enable others skilled in the art to which it appertains to make and use the same.

This invention relates to processes of making new caoutchouc-like products by the reaction of fuming sulfuric acid on a ketone, either simple or compound, or a mixture of ketones, and the separation of the solid caoutchouc-like material from the other products of the reaction.

In place of reacting on a ketone, or a mixture of ketones, by means of sulfuric acid, the latter may also be used to react on a ketone or a mixture of ketones and an aliphatic oxid. The following is an example of the reaction just mentioned:—

If, for instance, 3.5 liters of fuming sulfuric acid are added to a mixture consisting of 2 liters of acetone and 1.5 liters of ethyl-alcohol or 1.25 liters of ethylether, accompanied by cooling, and the liquid by-products (which can also be used for obtaining caoutchouc) are distilled off after the reaction, the acid product being neutralized approximately 2 kilos of raw caoutchouc and 500 grams of isoprene are obtained. The caoutchouc can be purified by precipitation with alcohol or by other means.

Another method of carrying the invention into effect consists in passing unsaturated hydrocarbons, especially ethylene, through a heated mixture of ketones and fuming sulfuric acid containing anhydrid, especially through a mixture of acetone and fuming sulfuric acid containing anhydrid, whereby isoprene and caoutchouc are obtained.

*Example.*

To 6 kilograms of actone contained in a vessel with a cooler thereon, I add gradually, in small portions, 9 kg. of fuming sulfuric acid containing 18 to 20% of anhydrid, in such manner that the temperature does not rise above 80 or 90° C. In about one hour and a quarter all the sulfuric acid will have been added. Thereupon the mixture, which is still hot, is placed in another vessel provided with a gas induction pipe and an eduction pipe. Then about 3 kilograms of ethylene gas are passed through the mixture and the same is heated to a temperature of 100 to 110°. In 2 or 3 hours the reaction is complete, and solid caoutchouc-like substances and liquid products are formed. The liquids are distilled off and collected in a container cooled by a cooling mixture. The non-condensable gases escape by way of a pipe connected to this container. After neutralization of the acid mixture about 5 kilograms of raw caoutchouc and about 1.5 kilograms of isoprene with other volatile products are obtained.

The reaction involved may be represented by the following equations:

*Equation I.*

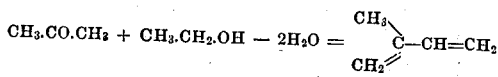

*Equation II.*

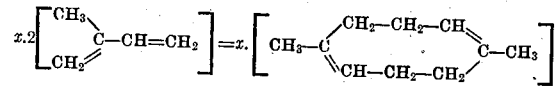

Equation 1 shows how isoprene is formed from acetone and ethylene. Equation 2 shows how the molecule of isoprene $C_5H_8$ is doubled so as to become converted into caoutchouc having the formula $C_{10}H_{16}$. In place of ethylene I may use homologues such as propylene, butylene, amylene, etc. Instead of olefins, diolefins may be used such as allene or erythrene. Also the acetylenes may be used such as acetylene, or methyl acetylene, and the olefin acetylenes such as diacetylene.

The raw isoprene obtained simultaneously with the caoutchouc-like body has a boiling point of 30 to 40° C. and its composition is represented by $C_5H_8$. By subjecting it to the action of fuming sulfuric acid it can be polymerized to a caoutchouc substance, which is characterized by insolubility in alcohol. The polymerized body thus obtained may be identified by its composition, which corresponds to the formula $C_{10}H_{16}$, as well as by its appearance and elasticity, its solubility in the usual caoutchouc solvents, and by its insolubility in alcohol.

By the action of sulfur dichlorid a product of vulcanization is formed which is insoluble in benzol, and in alcohol.

Various experiments have shown that homologues and analogues as well as mixtures of caoutchouc are obtained when a simple ketone or a mixed ketone is heated alone or heated with fuming sulfuric acid.

If for instance 500 grams of acetone are heated for about five to twenty minutes to a temperature of from 130 to 140 degrees C., with about 350 grams of sulfuric acid containing 18 to 20% of sulfuric anhydrid, one obtains after distilling off the liquid products, and neutralizing with lye, approximately 350 grams of solid caoutchouc-like substances. Similar caoutchouc substances are obtained by heating acetone with diethyl ketone and acid or by heating methyl-ethyl-ketone alone with acid, or by heating methyl-ethyl-ketone with propyl-butyl-ketone, or acetone with diethyl-ketone and methhyl-ethyl-ketone and propyl-butyl-ketone.

Aromatic ketones, such as acetophenone, when heated with fuming sulfuric acid, produces a caoutchouc-like substance, and caoutchouc-like substances are also produced by treating acetophenone with acetone or with one or more aliphatic ketones and fuming sulfuric acid.

The ketones and alcohols used in carrying out this invention are those which are liquid at ordinary temperatures.

What I claim as my invention and desire to secure by Letters Patent of the United States is:—

1. In the art of producing a diolefin and a caoutchouc-like body, the improvement which consists in adding fuming sulfuric acid to a ketone capable of yielding isoprene and caoutchouc and separating the products formed.

2. In the art of producing a diolefin and a caoutchouc-like body, the improvement which consists in adding fuming sulfuric acid to a ketone and an alcohol both capable of yielding isoprene and caoutchouc, and separating the products formed.

3. In the art of producing a diolefin and a caoutchouc-like body, the improvement which consists in adding fuming sulfuric acid to an aliphatic ketone and an alcohol both capable of yielding isoprene and caoutchouc and separating the products formed.

4. In the art of producing a diolefin and a caoutchouc-like body, the improvement which consists in adding fuming sulfuric acid to a mixture of an aliphatic ketone and an alcohol both capable of yielding isoprene and caoutchouc and separating the products formed.

In testimony whereof I hereunto affix my signature in the presence of two witnesses.

HERMANN STERN.

Witnesses:
A. V. W. COTTER,
N. ROEDERS.